United States Patent
Huang et al.

(10) Patent No.: US 10,810,485 B2
(45) Date of Patent: Oct. 20, 2020

(54) DYNAMIC CONTEXT-SELECTIVE CONVOLUTIONAL NEURAL NETWORK FOR TIME SERIES DATA CLASSIFICATION

(71) Applicant: Intel Corporation, Santa Clara, CA (US)

(72) Inventors: Freddie H. Huang, Chiayi (TW); Omar U. Florez, Sunnyvale, CA (US); Jonathan J. Huang, Pleasanton, CA (US); Yen-Kuang Chen, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 724 days.

(21) Appl. No.: 15/263,581

(22) Filed: Sep. 13, 2016

(65) Prior Publication Data
US 2018/0075336 A1    Mar. 15, 2018

(51) Int. Cl.
  *G06N 3/04* (2006.01)
(52) U.S. Cl.
  CPC .................. *G06N 3/0454* (2013.01)
(58) Field of Classification Search
  CPC ............... G06N 3/0454; G06N 3/0455; G06K 9/00147; G06K 9/6249
  See application file for complete search history.

(56) References Cited

U.S. PATENT DOCUMENTS

| 7,149,688 B2 * | 12/2006 | Schalkwyk | G10L 15/187 704/255 |
| 9,177,550 B2 * | 11/2015 | Yu | G06N 3/0481 |
| 2016/0148078 A1 * | 5/2016 | Shen | G06K 9/66 382/158 |
| 2016/0321633 A1 * | 11/2016 | Chandrasekaran | G06Q 20/20 |
| 2017/0103752 A1 * | 4/2017 | Senior | G10L 15/16 |
| 2018/0082153 A1 * | 3/2018 | Wan | G06K 9/00147 |
| 2018/0151177 A1 * | 5/2018 | Gemmeke | G10L 15/1822 |

OTHER PUBLICATIONS

Zhicheng Cui, Multi Scale Convolutional Neural Networks for Times Series classification, May 11, 2016, v4, National Science Foundation of the United States (Year: 2016).*
Shaoqing Ren, Faster R-CNN: Towards Real-Time Object Detection with Region Proposal Networks, 2015, Microsoft Research (Year: 2015).*
Aliaksei Severyn, Learning to Rank Short Text Pairs with Convolutional Deep Neural Networks, 2015, ACM New York USA (Year: 2015).*
Alexander Novikov, Tensorizing Neural Networks, Dec. 2015, Neural Information processing Systems Canada (Year: 2015).*

(Continued)

*Primary Examiner* — Ann J Lo
*Assistant Examiner* — Van C Mang
(74) *Attorney, Agent, or Firm* — Finch & Maloney PLLC

(57) ABSTRACT

A convolutional neural network for classifying time series data uses a dynamic context selection. In one example a method includes receiving a plurality of inputs of different sizes at a convolutional neural network, applying convolution and pooling to each of the inputs to provide a plurality of outputs of different sizes, changing the size of each of the outputs to a selected uniform size, reshaping each of the outputs to a vector, and fully connecting the vectors.

19 Claims, 3 Drawing Sheets

(56) References Cited

OTHER PUBLICATIONS

Alex Krizhevsky, ImageNet Classification with Deep Convolutional Neural Networks, Sep. 2012 (Year: 2012).*
Ossama Abdel-Hamid, Convolutional Neural Networks for Speech Recognition, Oct. 2014, IEEE/ACM, vol. 22, No. 10 (Year: 2014).*
Ren, "Faster R-CNN: Towards Real-Time Object Detection with Region Proposal Neworks", 2015 (Year: 2015).*
Tompson, "Joint Training of a Convolutional Network and a Graphical Model for Human Pose Estimation", pp. 1-9, 2014 (Year: 2014).*
Hu, "Convolutional Neural Network Architectures for Matching Natural Language Sentences", pp. 1-9, 2014 (Year: 2014).*
Abdel-Hamid, "Convolutional Neural Networks for Speech Recognition", pp. 1533-1545, 2014 (Year: 2014).*
Andrearczyk, "Using filter banks in Convolutional Neural Networks for texture classification", pp. 63-69, 2016 (Year: 2016).*
Chen, "Business-Aware Visual Concept Discovery from Social Media for Multimodal Business Venue Recognition", pp. 101-107 (Year: 2016).*
Wei, "V4 Neural Network Model for Shape-Based Feature Extraction and Object Discrimination", pp. 753-762 (Year: 2015).*
Sainath, "Convolutional, Long Short-term memory, Fully Connected Deep Neural Newtorks", IEE, 2015 (Year: 2015).*
Cui, "Multi-Scale Convolutional Neural Networks for Time Series classification", May 11, 2016, V4, 2016 (Year: 2016).*
Kontschieder, "Deep Neural Decision Forests", pp. 4190-4194, Jul. 2016 (Year: 2016).*
Tompson, "Joint Training of a Convolutional Network and a Graphical Model for Human Pose Estimation", Neural information processing systems foundation inc. 2014 (Year: 2014).*
Cui Multi-Scale Convolutional Neural Networks for Time Series classification, May 11, 2016, v4, National Science Foundation of the United States (Year: 2016).*
Severyn, "Learning to Rank Short Text Pairs with Convolutional Deep Neural Networks", 2015 ACM New York USA (Year: 2015).*
Abdel-Hamid, "Convolutional Neural Networks for Speech Recognition" Oct. 2014, IEEE/ACM, vol. 22, No. 10 (Year: 2014).*
Zhang, "Multimodal Deep Convolutional Neural Network for Audio-Visual Emotion Recognition", 2016 (Year: 2016).*
Sainath, "Convolutional, Long Short-Term Memory,Fully Connected Deep Neural Networks", IEEE (Year: 2015).*
Phan, "Robust Audio Event Recognition with 1-Max Pooling Convolutional Neural Networks", 2016 (Year: 2016).*
Zha, "Exploiting Image-trained CNN Architectures for Unconstrained Video Classification", 2015 (Year: 2015).*
Sainath, T and C Parada, "Convolutional Neural Networks for Small-footprint Keyword Spotting", Proc. Interspeech,2015, 5 pages.
Chen, YH et al., "Locally-Connected and Convolutional Neural Networks for Small Footprint Speaker Recognition", Interspeech 2015, Sep. 2015, pp. 1136-1140.
He, K et al., "Spatial Pyramid Pooling in Deep Convolutional Networks for Visual Recognition", arXiv:1406.4729v4, Apr. 23, 2015, 14 pages.
"Global pooling layer #2316", in BVLC / caffe, https://github.com/BVLC/caffe/issues/2316; Accessed: Nov. 23, 2015, 1 page [retrieved Sep. 3, 2019].
"IMAGENET Large Scale Visual Recognition Challenge 2013 (ILSVRC2013)", retrieved from the Internet: http://image-net.org/challenges/LSVRC2013/results.php [retrieved Sep. 3, 2019], 13 pages.
"Using Deep Learning to Listen for Whales—Daniel Nouri's Blog", retrieved from the Internet: http://danielnouri.org/notes/2014/01/10/using-deep-learning-to-listen-for-whales [retrieved Sep. 3, 2019], 13 pages.
Hernandez, Daniela, "Now You Can Build Google's $1M Artificial Brain on the Cheap / WIRED", retrieved from the Internet: https://www.wired.com/2013/06/andrew-ng/ [retrieved Sep. 3, 2019], 8 pages.

* cited by examiner

DYNAMIC CONTEXT-SELECTIVE CONVOLUTIONAL NEURAL NETWORK FOR TIME SERIES DATA CLASSIFICATION

FIELD

The present application relates to convolutional neural networks for recognizing sounds and images and, in particular, to adapting a network for input data of different sizes.

BACKGROUND

With the advent of large megapixel small sensor cameras, still and video photography using smartphones, action cameras, and other small portable devices has greatly increased. This has been accompanied by server system and wireless Internet connections to receive, catalog, and archive the great amount of uploaded still and video imagery. The vast collections of imagery and constant production of more in the user community has driven the development of new applications to make use of the extensive amount of date available.

Many applications for still and video imagery rely on computer vision and image understanding technology. Using automated systems, objects, scenes, people, events, and other related aspects of an image can be determined by analyzing the image. In many cases, an image or an audio file will include metadata that provides time, location, and user information. The metadata provides additional clues about the content of an image or sound that can be used together with the actual image or sound to identify images or objects in images. This information may then be used to classify images or audio files and add additional metadata associated to the image or audio with names of objects, scenes, people, events, etc.

Similar techniques are also being applied to scientific observation and surveillance images sounds, and other information. For scientific purposes, a location may be monitored for wildlife and then received video may be analyzed to determine when particular types of animals appear. This may be combined with images from many different locations to develop a model for movement or behavior of various animals. Submarine microphones have been used in a similar way to monitor movement and behaviors of various marine animals.

Generic object detection techniques automatically recognize and localize the instances of objects that appear in an image, sound clip, or a video frame. In many cases, the technique only detects objects that fall within particular categories or classes that are of interest for other analysis tools. As an example, a system may recognize and localize people but not trees. The same system may also recognize and localize particular animals. An object recognition system may then classify each animal based on the type of animal. Object detection may be considered to be a fundamental task in computer vision with a broad range of different applications. These applications include scene understanding, image search, augmented reality, surveillance, autonomous driving and so on. These applications are becoming prevalent and diverse, especially on mobile devices and other devices with embedded cameras. High accuracy and high speed object detection is important in personal, home, business, professional, and industrial fields.

Convolutional Neural Networks (CNN) are the state of the art methodology for many computer vision, image understanding, and audio classification tasks. CNN can provide accurate identifications and predict future results. For images, these techniques use an extended training time on an initial set of labeled training images. Enhanced techniques are used to analyze time series data.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

An innovative dynamic context-selection layer is described herein for use with the convolutional layer of CNN. This new layer aggregates along the temporal dimension within a CNN and, in this way, it reduces the number of connections needed by the CNN.

The resulting modified CNN has a simpler architecture with fewer weights to be trained. This corresponds to faster training times than can be achieved using less processing resources. The modified CNN also provides a more general solution to variable length or time series data like audio, video, and accelerometer data. A traditional implementation of CNN can only classify windows of a fixed and predetermined length, while the approach described herein can process data inputs of different sizes or lengths within the same operation.

Convolutional neural networks may be pre-trained with known images. After training, the CNN develops low-level, middle-level, or high-level convolutional feature maps or all three by applying images or sounds to the pre-trained convolutional neural network model The feature maps may be used for detecting regions of interest and object detection within the regions. Object detection may be followed by object classification which is done using sliding window-based classifiers or a region proposal-based classifier.

In the sliding window strategy, object classifiers are separately evaluated at evenly spaced positions with various scales over the entire image. The position and scale define each window. There can be millions of sliding windows to evaluate in a test image, imposing a heavy computational burden. One region proposal based technique is Regions with Convolutional Neural Networks (R-CNN) which provides better accuracy and less computational burden. A region proposal method uses potential image regions and organizes them by hierarchical segmentation and grouping. Object detection is performed only in the proposed image regions. In this case, each proposed image region is resized to some fixed size in order to run the related CNN features and object classifiers.

As described in more detail below, an innovative dynamic context-selection layer may be inserted into the middle convolutional layer. This layer accommodates inputs with different lengths into a CNN model, overcoming a fixed-length input dimension limitation. The enhanced CNN may be used in a wide range of machine learning applications. It is particularly well suited to problem data sets such as those in which time plays a role to explain information. These applications include predictions of human activities in video, classification of audio events, and speech recognition.

While a CNN is able to provide accurate predictions, the accuracy comes at the expense of long-training times on expensive high speed processing hardware. Clusters have been used that require a billion connections and 16 computers running for several days just for training. For time-series data, the complexity increases still more.

Figure 1:
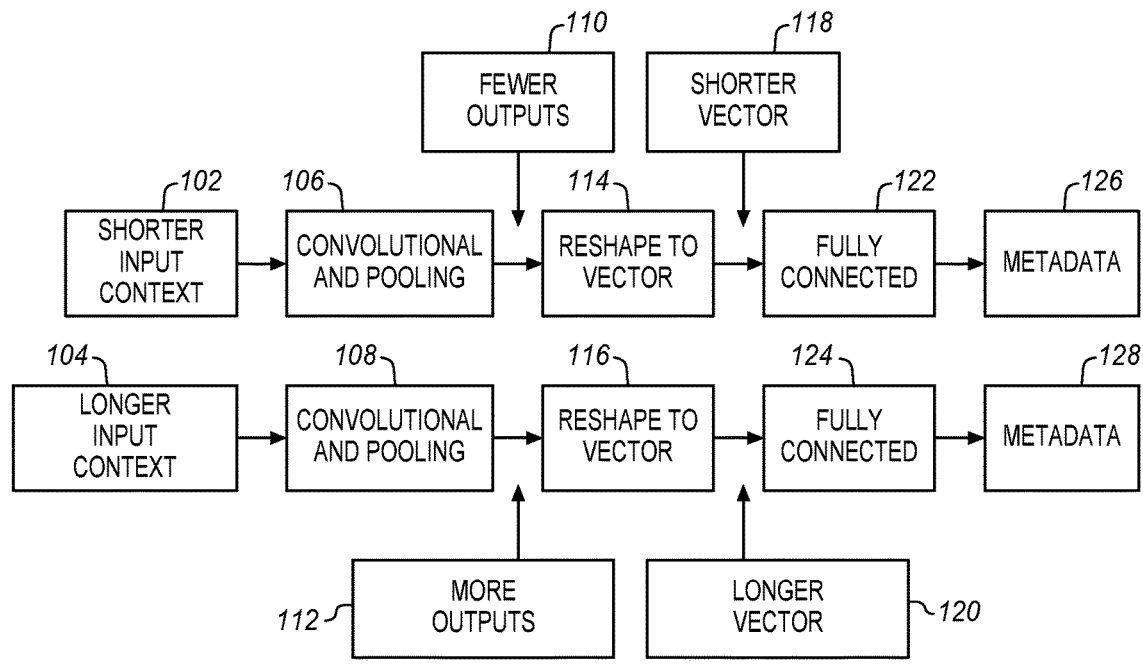
FIG. 1 is a modular block diagram of convolutional neural network models.

FIG. 1 is a modular block diagram of two different CNN models. These show operations in sequence that may be performed by dedicated hardware or by software modules on a general purpose processor. In some implementations, dedicated hardware is used for each module to allow for parallel architectures to process large datasets more quickly. CNN models are typically composed of two major parts. The first part 106, 108 has the convolutional and pooling layers. The second part 122, 124 has the fully connected layers. The number and order of the convolutional and pooling layers may vary for different CNN techniques.

For time series data, such as audio, the input 102, 104 of the CNN into the convolutional and pooling layers can be considered as a patch of spectrogram with spectral and temporal dimensions. For image input, the input may be considered as pixel maps that are all the same size by rescaling or cropping. The images may be part of a video sequence of images. In the convolutional and pooling layers, the output 110, 112 size is proportional to the temporal context or the duration of the input. As shown, the shorter input context 102 into the upper CNN model produces fewer outputs 110 from the convolutional and pooling layers. Conversely, the longer input context 104 into the convolutional and pooling layers 108 of the lower CNN model produces more output 112 indicated by the larger blocks for the inputs 104 and the outputs 112. In other words, the longer the context, the more outputs the convolutional and pooling layers generate.

The outputs of the two CNN models are each passed to respective reshape to vector blocks 114, 116 to produce vectors 118, 120 which are the inputs to the respective fully connected layers 122, 124. The fully connected layers produce the output metadata 126, 128. This may be classification, identification, region of interest, or other types of metadata describing the inputs. For audio inputs, the metadata may identify a speaker or a spoken utterance. The differences in the outputs result in variations in the input vectors 118, 120 of the fully connected layers. This is indicated by the larger block for the longer vectors 120 of the lower CNN model. The variations in the vector lengths prevent this CNN model architecture from working for input signals 102, 104 of varying length. As a result, each CNN model operates on a uniform input context with a predefined uniform length.

For many CNN architectures, the first part will produce an output with a size that depends on the size of the input. Any size input may be used without modifying the technique. However, larger sizes require more resources to process. A sliding window process is normally used that adapts to the size of the input. On the other hand, the second part requires that all of the inputs, the vectors as shown, be the same size. In order for the vectors to be the same size, the input is normally adapted to all be the same size. Consistent sample sizes, cropping, truncating and other approaches may be used to force all of the inputs 102, 104 to be the same size.

Figure 2:
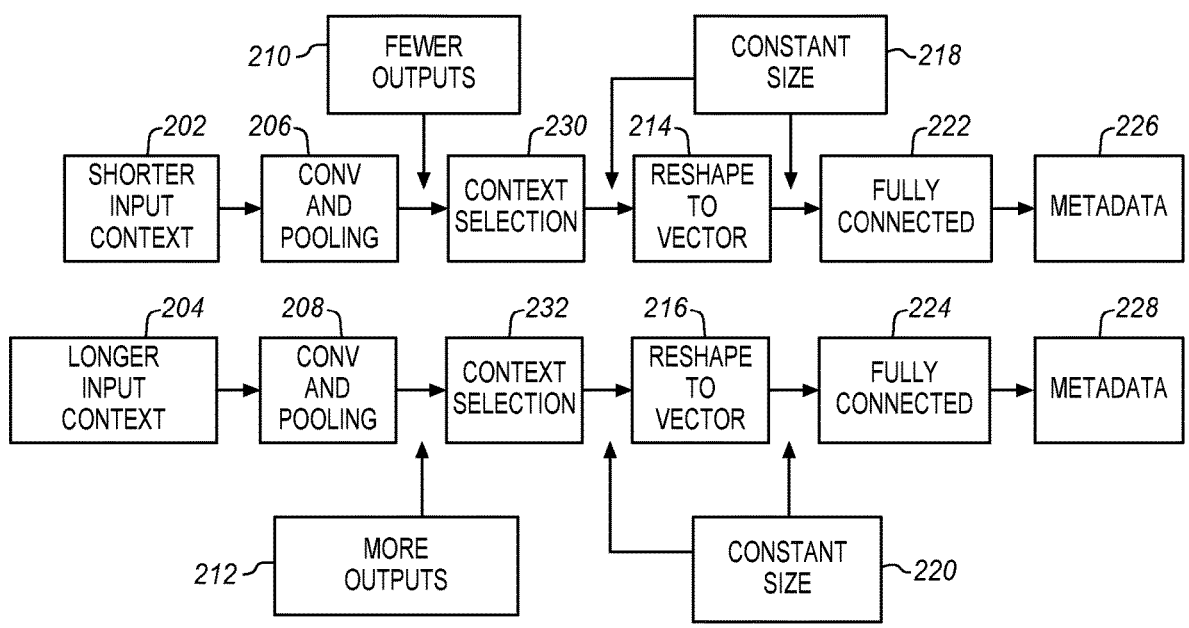
FIG. 2 is a modular block diagram of convolutional neural network models with a context selection according to an embodiment.

FIG. 2 is a modular block diagram of two different and alternative CNN models. These models are similar but in both cases dynamic context selection layer 230, 232 is placed between the two parts. The dynamic context selection layer selects a single context according to some criteria, and then produces a constant-sized output that is applied to the fully connected layers. This allows the same fully connected layer part of the network to be used for any length input context. In some embodiments, the dynamic selection layer applies optimization criteria to the received outputs and selects a best output size. The outputs are then modified to meet this size criterion.

In more detail, FIG. 2 shows similar input contexts to those of FIG. 1. The upper model receives a fixed smaller size input context 202 and the lower model receives a fixed larger size input context 204. These are applied to respective convolutional and pooling layers 206, 208. The output results 210, 212 are in different sizes as in the previous diagram with fewer outputs 210 for the shorter input context 202 and more outputs 212 for the longer input context 204. These different results are each applied to a respective context selection layer 230, 232. Here the outputs are conformed to the same optimized size 218, 220 and then applied to a respective reshape to vector block 214, 216. This then provides a uniform size for both CNN models to the respective fully connected layers 222, 224. The fully connected layers receive the input and then generate metadata 226, 228 to describe the inputs based on the prior training of the model.

As a further alternative, the shorter 202 and longer 204 input contexts may both be applied to the same convolutional and pooling layers 206 of the same CNN model. The context selection block will then conform the outputs to a uniform size suitable for all of the inputs. Accordingly classification is performed on the chosen parts of the outputs that remain after the context selection. A fixed size output may be produced independent of the input length. The input length shown above may correspond to a variety of different physical parameters, depending on the particular implementation. In some embodiments, the input length corresponds to the amount of time or duration of a window in a video or audio event.

The dynamic context selection layer 230, 232 may take any of a variety of different forms. The dynamic context selection in some embodiments will select a fixed-size window from the variable-length inputs that it receives. Maximal energy, minimal energy, maximal entropy and minimal entropy may be used separately or in various combinations to select a fixed-size window from the variable-sized inputs.

Figure 3:
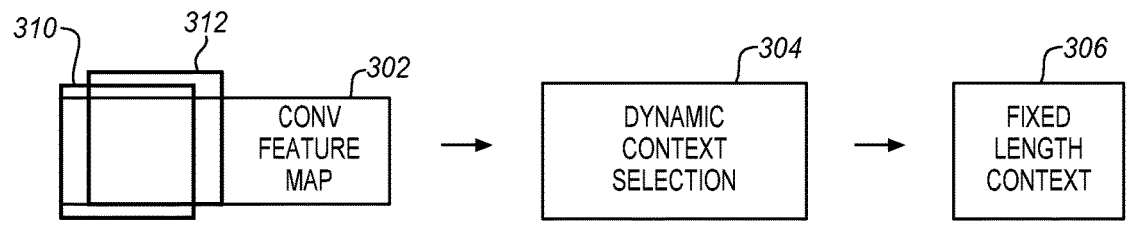
FIG. 3 is a diagram of a process for context selection according to an embodiment.

FIG. 3 shows an example process in which there is a convolution feature map 302 which is an output of a convolutional and pooling block, as shown in FIG. 2. The dynamic context selection 304, shown as 230, 232 in FIG. 2, places a window 310 at one location of the feature map. A sliding window is used to move the window to multiple positions 312 across the feature map. While a sliding window is shown and described herein, a variety of different windowing approaches may be used. The windows are evaluated using maximal energy determinations to determine a fixed length context 306. Upon being determined, the fixed length context is then applied to each of the feature maps in a set. This provides a uniform set of vectors to the fully connected layer notwithstanding the variable size of the input context and the resulting convolutional feature maps.

In one example, a maximal energy selection is done by first calculating the energy of each window of a particular feature map. The selected context may then be determined as stated in Equation 1.

$$\text{selected context} = \operatorname{argmax}\{h.\text{start}, h.\text{end}, w.\text{start}, w.\text{end}\}$$
$$(\Sigma_{i=h.\text{start}}^{h.\text{end}} \Sigma_{i=h.\text{start}}^{w.\text{end}} |\text{conv\_feature\_map}(i,j)|^2) \quad \text{(Eq. 1)}$$

Equation 1 suggests that the selected context is the fixed length window with the maximum L2 energy. The argmax function is the extension of a window of large energy that is parameterized by arguments h (window height) and w (window width). L2 being the squared sum of the weights from the convolutional layers. The windows may slide in either the vertical direction i or the horizontal direction j or both so that the maximum argument, argmax, is determined across all convolutional feature maps in i and j. The energy is summed for all i from a starting or smallest window height (h.start) to an ending or largest window height (h.end) and for all j from a starting window width (w.start) to an ending window width (w.end).

$$\text{selected context} = \operatorname{argmin}\{h.\text{start}, h.\text{end}, w.\text{start}, w.\text{end}\}$$
$$(\Sigma_{i=h.\text{start}}^{w.\text{end}} \text{Entropy}|\text{conv\_feature\_map}(i,j)|^2) \quad \text{(Eq. 2)}$$

Equation 2 suggests that the selected context is the fixed length window with the minimum entropy of the convolutional feature map. The windows may slide in either the vertical direction i or the horizontal direction j or both so the maximum is determined across the square of all convolutional feature maps in i and j. The energy is summed for all i from a starting or smallest window height (h.start) to an ending or largest window height (h.end) and for all j from a starting window width (w.start) to an ending window width (w.end).

The maximal or minimal energy or entropy may be used. In some embodiments, pooling histogram bins of the convolutional feature maps may be used to determine the entropy. There may any number of different histogram bins. In some embodiments audio samples of speech or spoken utterances are analyzed and 10 to 15 bins are used.

First a w value for each bin is determined as the range of each bin factored by the number of bins. This may be expressed as in Equation 3.

$$\text{bins\_}w = (\text{max\_value} - \text{min\_value})/(\text{num\_hist\_bins}) \quad \text{(Eq. 3)}$$

This may be performed for all sliding windows with i ranging from the starting (w.start) width to the ending width (w.end) and j ranging from the starting height (h.start) to the ending height (h.end).

$$\text{bins\_id} = (\text{conv\_feature\_map}(i,j) - \text{min\_value})/$$
$$\text{bins\_}w\text{hist}[\text{bins\_id}]++ \quad \text{(Eq. 4)}$$

As explained in Equation 4, a bins identification value is set which compares the convolutional feature map value at each point (i,j) in each sliding window to the minimum value of each bin in that in that map and factors it by the w value. This is done for each bin of the histogram as represented in the following pseudocode sequence.

```
for bins_id from 0 to (num_bins -       (Eq. 5)
1)
{
prob = (hist[bins_id])/sum(hist[...]))
Entropy -= prob*log(prob)
}
```

The entropy may then be determined as stated in Equation 5 using the probability (prob). The probability is determined using the histograms. The probability may be determined across all bins, that is from bin (0) to bin (the number of bins−1) or alternatively from bin (1) to bin (the number of bins).

$$\text{selected context} = \operatorname{argmin}\{\text{all sliding windows}\}(\text{Entropy}) \quad \text{(Eq. 6)}$$

$$\text{selected context} = \operatorname{argmax}\{\text{all sliding windows}\}(\text{Entropy}) \quad \text{(Eq. 7)}$$

Having determined entropy values for each convolutional feature map, the minimum entropy as in Equation 6 or the maximum entropy as in Equation 7 may be used to select a fixed length context of the convolutional feature maps to be reshaped to vectors for use in the fully connected layers. As with the energy, the minimum or maximum is taken across all sliding windows.

Figure 4:
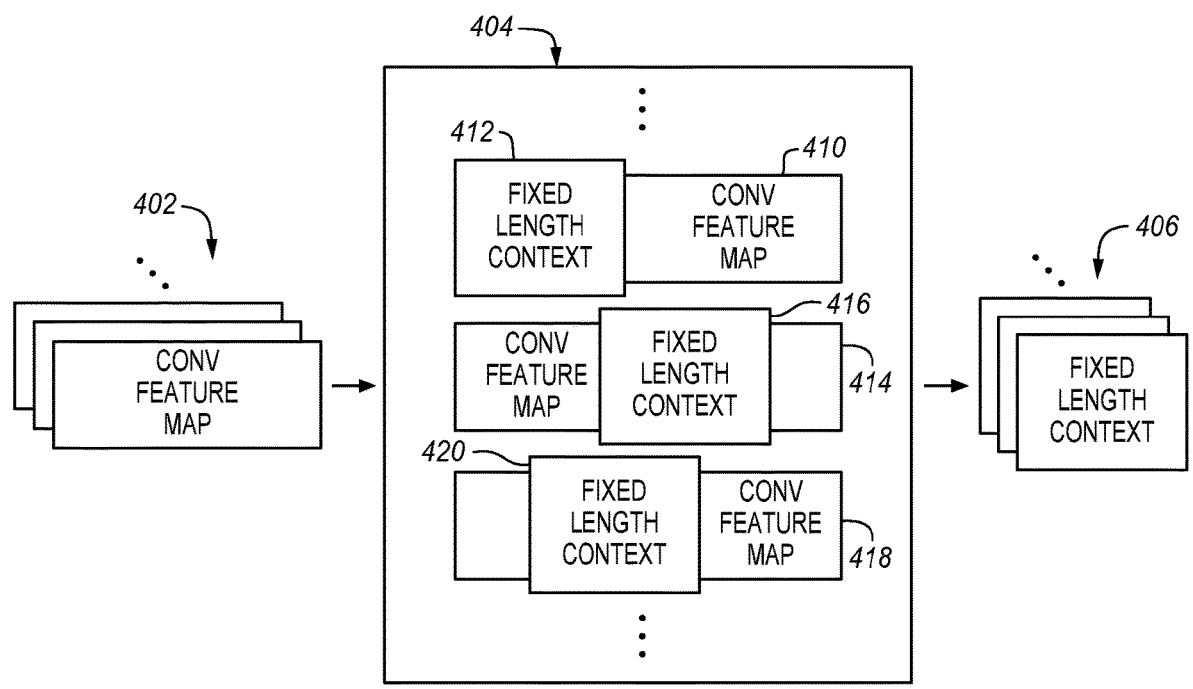
FIG. 4 is a diagram of an alternative process for context selection according to an embodiment.

In some embodiments multiple selected contexts may be combined to form a single input for the fully-connected layer. This is indicated in FIG. 4 a diagram of a series of convolutional feature maps 402 analyzed 404 using fixed length sliding windows 412, 416, 420, to obtain a series of fixed length contexts 406. In this analysis, a fixed length window is applied to each convolutional feature map 410, 414, 418. The windows may be placed on different locations of each respective convolutional feature map 410, 414, 418. The particular positioning of the window may be determined as described above.

The same energy or entropy selection techniques may be applied to different convolutional feature maps, or multiple energy and entropy selection techniques may be applied to the same convolutional feature map, or these approaches may be combined in any of a variety of different ways. These approaches and variations will provide a fixed size input to the fully-connected layer.

The described techniques have a temporal nature. Since the context selection is based on the convolutional feature maps that are received at any one time, if the nature of the input context changes, then the selection may no longer be the best selection. In other words, the optimization criterion may not be satisfied. In many scenarios, the statistics of the received input context, including the energy and entropy may change over time. In the example of classifying audio sounds, there may be a sequence of very short duration events such as coughs or sneezes. This may be followed by much longer duration events such as speech utterances that last several seconds.

By reviewing feature maps as they are processed, the context selection adapts to changing environments. This provides a dynamic context selection. In some applications, entropy selection methods may be more representative of the actual portion of interest of a feature map than MAX, MIN, L1, and L2 are. The best approach may differ with different types of input and with different distributions of input values over a sequence of information.

While the above descriptions show that the dynamic context selection layer is added after all the convolution layers, embodiments are not so limited. In some embodiments, the context selection layer may be among the pooling layers. As an example, the dynamic selection may take place after one or more or even each convolutional step and collect weights from multiple time windows. In addition, the size of the sliding window may be modified. This context window may change across space and time. The height or the width may be smaller than the corresponding dimension of the output convolutional feature maps.

The described techniques reduce the barrier of classifying time-series data, such as video and audio events. This is useful in a wide range of different types of devices including intelligent IoT (Internet of Things) monitors and terminals. The described techniques are much more flexible then constraining all outputs to a fixed size window for classification. Instead, as described herein, a fixed-size segment is selected and classification is performed on the selected segment.

For audio event classification the described sliding window approach provides results better than or similar to that of fixed size segment approaches but with far fewer computations being required. This is in part because the sliding window segment may be made shorter than the fixed size segment.

Figure 5:
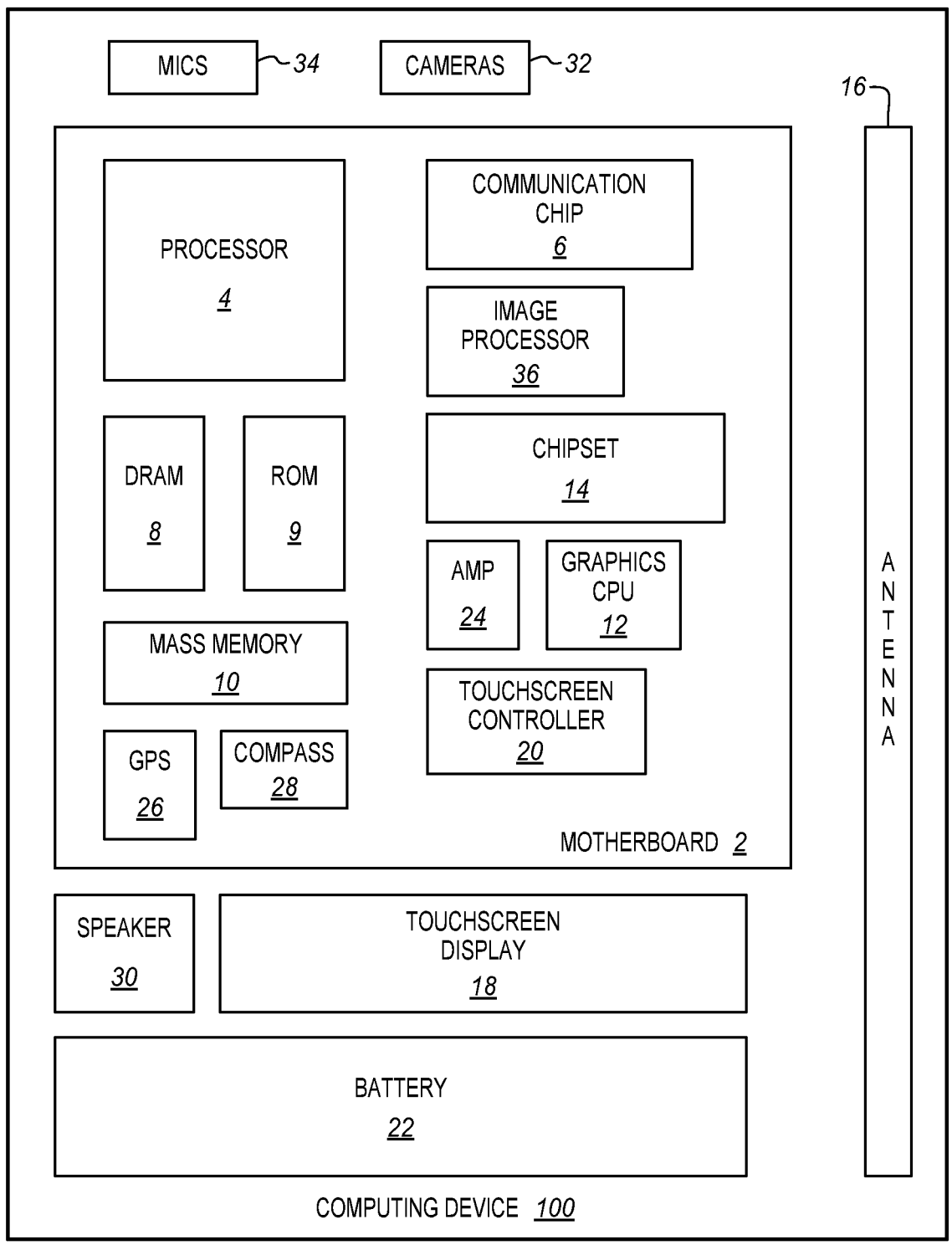
FIG. 5 is a block diagram of a computing device incorporating regions proposal and object detection and classification according to an embodiment.

FIG. 5 is a block diagram of a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, cameras 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 including any depth sensors or proximity sensor are coupled to an optional image processor 36 to perform conversions, analysis, noise reduction, comparisons, depth or distance analysis, CNN-based image understanding and other processes as described herein. Similarly, the microphones 34 may be coupled to audio processors, digital signal processors (not shown) or the main processor 4 for CNN-based audio processing. The processor 4 is coupled to the image processor to drive the process with interrupts, set parameters, and control operations of the image processor and the cameras. Image processing may instead be performed in the processor 4, the cameras 32 or in any other device. The classified images or audio may be used by the processor as a command interface, for image understanding, or other purposes. The images or audio may also be received from a remote source through the communications chip or retrieved from mass memory, depending on the implementation.

In various implementations, the computing device 100 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes receiving a plurality of inputs of different sizes at a convolutional neural network, applying convolution and pooling to each of the inputs to provide a plurality of outputs of different sizes, changing the size of each of the outputs to a selected uniform size, reshaping each of the outputs to a vector, and fully connecting the vectors.

In further embodiments the different sizes of the inputs correspond to different durations.

Further embodiments include selecting the selected uniform size by applying an optimization function to the plurality of outputs.

In further embodiments the plurality of outputs are convolutional feature maps and selecting the uniform size comprises selecting a size by determining a size having a maximum energy in a set of the convolutional feature maps.

In further embodiments determining a maximum energy comprises determining a maximum energy using a sliding window across the feature maps.

In further embodiments the plurality of outputs are convolutional feature maps and wherein selecting the uniform size comprises selecting a size by determining a size having a maximum entropy in a set of the convolutional feature maps.

In further embodiments the plurality of outputs are convolutional feature maps and wherein selecting the uniform size comprises selecting a size by determining a size having a minimum entropy in a set of the convolutional feature maps.

In further embodiments the plurality of outputs are convolutional feature maps and wherein selecting the uniform size includes sliding a window across the feature maps, evaluating the windows using an optimization function, and selecting a size based on the optimization function.

Further embodiments include combining multiple selected contexts.

In further embodiments the inputs are digital samples of spoken utterances.

In further embodiments the inputs are digital samples of a video

Some embodiments pertain to a computing system that includes a memory to store a plurality of spoken utterances of different durations for a convolutional neural network, a processor to apply convolution and pooling to each of the inputs to provide a plurality of outputs of different sizes, to change the size of each of the outputs to a selected uniform size, to reshape each of the outputs to a vector, and to fully connect the vectors, and a command interface to receive the fully connected vectors and interpret the spoken utterances as commands.

Further embodiments include a microphone to receive the plurality of spoken utterances.

In further embodiments the processor further selects the uniform size by applying an optimization function to the plurality of outputs.

In further embodiments the plurality of outputs are convolutional feature maps and wherein selecting the uniform size comprises selecting a size by determining a size having a maximum energy in a set of the convolutional feature maps.

Some embodiments pertain to a machine-readable medium having a plurality of instructions that when executed by the machine cause the machine to perform operations that include receiving a plurality of inputs of different sizes at a convolutional neural network, applying convolution and pooling to each of the inputs to provide a plurality of outputs of different sizes, changing the size of each of the outputs to a selected uniform size, reshaping each of the outputs to a vector, and fully connecting the vectors.

In further embodiments the plurality of outputs are convolutional feature maps the operations further comprising selecting a uniform size by determining a size having a maximum energy in a set of the convolutional feature maps.

In further embodiments the plurality of outputs are convolutional feature maps and the operations further comprising selecting a uniform size by determining a size having a maximum entropy in a set of the convolutional feature maps.

In further embodiments the plurality of outputs are convolutional feature maps the operations further comprising selecting a uniform size by determining a size having a minimum entropy in a set of the convolutional feature maps.

In further embodiments the plurality of outputs are convolutional feature maps the operations further comprising selecting a uniform size by sliding a window across the feature maps, evaluating the windows using an optimization function, and selecting a size based on the optimization function.

Some embodiments pertain to an apparatus that includes means for receiving a plurality of inputs of different sizes at a convolutional neural network, means for applying convolution and pooling to each of the inputs to provide a plurality of outputs of different sizes, means for changing the size of each of the outputs to a selected uniform size, means for reshaping each of the outputs to a vector, and means for fully connecting the vectors.

In further embodiments the plurality of outputs are convolutional feature maps the apparatus further includes means for selecting a uniform size by determining a size having a maximum energy in a set of the convolutional feature maps.

In further embodiments the plurality of outputs are convolutional feature maps and the apparatus further includes means for selecting a uniform size by determining a size having a maximum entropy in a set of the convolutional feature maps.

In further embodiments the plurality of outputs are convolutional feature maps the apparatus further includes means for selecting a uniform size by determining a size having a minimum entropy in a set of the convolutional feature maps.

In further embodiments the plurality of outputs are convolutional feature maps the apparatus further includes means for selecting a uniform size by sliding a window across the feature maps, evaluating the windows using an optimization function, and selecting a size based on the optimization function.

What is claimed is:

1. A method comprising: receiving a plurality of inputs of different sizes at a convolutional neural network, the plurality of inputs including (i) a first input having a first size and (ii) a second input having a second size different from the first size, wherein the first input has a first temporal context and the second input has a second temporal context; applying convolution and pooling to each of the first and second inputs to provide (i) a first output generated from the first input, and (ii) a second output generated from the second input, the second output having a different size than that of the first output, wherein the first output has a corresponding size that is based on the first temporal context, and the second output has a corresponding size that is based on the second temporal context; generating (i) a first modified output from the first output, and (ii) a second modified output from the second output, each of the first and second modified outputs having a uniform third size, wherein generating the first modified output comprises identifying first and second portions within the first output, each portion having the uniform third size, and selecting the first portion of the first output as the first modified output, wherein selection of the first portion is based on the first portion satisfying a criterion; reshaping each of the modified outputs to a corresponding vector, such that the first modified output is reshaped to a first vector, and the second modified output is reshaped to a second vector; and fully connecting the vectors.

2. The method of claim 1, wherein the different sizes of the inputs correspond to different durations, such that the first temporal context refers to a first duration, and the second temporal context refers to a second duration.

3. The method of claim 1, wherein selecting the first portion of the first output as the first modified output based on the first portion satisfying the criterion comprises applying an optimization function to the first and second outputs.

4. The method of claim 1, wherein selecting the first portion of the first output as the first modified output based on the first portion satisfying the criterion comprises:
determining that the first portion has a maximum energy among the first and second portions of the first output; and
selecting the first portion based on the first portion having the maximum energy among the first and second portions of the first output.

5. The method of claim 1, wherein the first output is a first convolutional feature map, and wherein identifying the first and second portions within the first output comprises:
sliding a window of the uniform third size across the first convolutional feature map, to identify the first and second portions within the first output, wherein each of the first and second portion corresponds to a corresponding location of the sliding window.

6. The method of claim 1, wherein selecting the first portion of the first output as the first modified output based on the first portion satisfying the criterion comprises:
determining that the first portion has a maximum entropy among the first and second portions of the first output; and
selecting the first portion based on the first portion having the maximum entropy among the first and second portions of the first output.

7. The method of claim 1, wherein selecting the first portion of the first output as the first modified output based on the first portion satisfying the criterion comprises:
determining that the first portion has a minimum entropy and/or a minimum energy among the first and second portions of the first output; and
selecting the first portion based on the first portion having the minimum entropy and/or the minimum energy among the first and second portions of the first output.

8. The method of claim 1, wherein the first and second portions of the first output is a first plurality of portions, wherein the second output is a convolutional feature map, and wherein generating the second modified output comprises:
sliding a window of the uniform third size across the convolutional feature map of the second output, to identify a second plurality of portions within the convolutional feature map, each portion of the second plurality of portions having the uniform third size, at least one portion of the second plurality of portions at least partially overlapping with at least another portion of the second plurality of portions;
selecting a second portion of the second plurality of portions of the convolutional feature map; and
outputting the selected second portion of the second plurality of portions as the second modified output.

9. The method of claim 1, further comprising combining the first and second modified outputs, wherein the inputs are digital samples of spoken utterances and/or digital samples of a video sequence of images.

10. A computing system comprising: a memory to store a plurality of spoken utterances of different durations for a convolutional neural network;
a processor to apply convolution and pooling to each of the spoken utterances (i) to provide a corresponding output of a plurality of outputs of different sizes, wherein individual outputs of the plurality of outputs has a corresponding size that is based on a duration of a corresponding spoken utterance of the plurality of spoken utterances, (ii) to change the size of each of the outputs to a selected uniform size, (iii) to reshape each of the outputs to a corresponding vector, and (iv) to fully connect the vectors,
wherein to change the size of a first output, the processor is to (i) identify a plurality of portions within the first output, each of a first portion and a second portion of the plurality of portions having the uniform size that is different from a size of the first output, (ii) select the first portion from the plurality of portions, based on the first portion satisfying a criterion, and (iii) change the first output to be the first portion of the first output; and
a command interface to receive the fully connected vectors and interpret the spoken utterances as commands.

11. The computing system of claim 10, further comprising:
a microphone to receive the plurality of spoken utterances,
wherein the processor further selects the uniform size by applying an optimization function to the plurality of outputs.

12. The computing system of claim 10, wherein the plurality of outputs are convolutional feature maps and wherein selecting the uniform size comprises selecting a size by determining a size having a maximum energy in a set of the convolutional feature maps.

13. A machine-readable medium having a plurality of instructions that when executed by the machine cause the machine to perform operations comprising:
receiving a plurality of inputs of different sizes at a convolutional neural network, wherein a size of an input is based on a duration of the input;
applying convolution and pooling to each of the inputs to provide a corresponding output of a plurality of outputs of different sizes, wherein a size of an output is based on a size of a corresponding input; changing the size of each of the outputs to a selected uniform size, wherein a first output comprises a convolutional feature map, and wherein changing the size of the first output comprises identifying plurality of portions within the convolutional feature map, selecting a first portion of the plurality of portions, based on the first portion satisfying a pre-defined criterion, and changing the first output to content of the selected first portion; reshaping each of the outputs to a corresponding vector; and fully connecting the vectors.

14. The medium of claim 13, wherein identifying the plurality of portions within the convolutional feature map comprises:
sliding a window of the selected uniform size across the convolutional feature map, wherein first content and second content of the convolutional feature map within respectively a first location and a second location of the sliding window correspond to the first portion and a second portion of the plurality of portions.

15. The medium of claim 14, wherein satisfying the pre-defined criterion comprises at least in part minimizing an entropy of content among the various locations.

16. The method of claim 1, wherein:
the first temporal context refers to a first duration, and the second temporal context refers to a second duration; and
the first output is proportional to the first duration, and the second output is proportional to the second duration.

17. The method of claim 1, wherein the first portion of the first output partially, but not fully, overlaps with the second portion of the first output.

18. The medium of claim 14, wherein satisfying the pre-defined criterion comprises at least in part maximizing an entropy of content among the various locations.

19. The medium of claim 14, wherein selecting the first portion of the plurality of portions comprises:
determining values of a function at various locations of the sliding window; and
selecting the first content of the window at the first location of the sliding window corresponding to the first portion, based on optimizing the function.

* * * * *